(12) United States Patent
Valt et al.

(10) Patent No.: US 12,093,286 B2
(45) Date of Patent: Sep. 17, 2024

(54) TIME SERIES DATA MANAGEMENT SYSTEMS AND METHODS

(71) Applicant: Intertrust Technologies Corporation, Berkeley, CA (US)

(72) Inventors: Rando Valt, Tallinn (EE); Oleg Mürk, San Francisco, CA (US); Kaarel Nummert, Tallinn (EE); Kristo Iila, Tartu (EE)

( * ) Notice: Subject to any disclaimer, the term of this patent is extended or adjusted under 35 U.S.C. 154(b) by 0 days.

(21) Appl. No.: 17/695,770

(22) Filed: Mar. 15, 2022

(65) Prior Publication Data

US 2023/0161795 A1 May 25, 2023

Related U.S. Application Data

(60) Provisional application No. 63/281,519, filed on Nov. 19, 2021.

(51) Int. Cl.
*G06F 16/28* (2019.01)
*G06F 16/22* (2019.01)
*G06F 16/2453* (2019.01)
*G06F 16/27* (2019.01)

(52) U.S. Cl.
CPC ........ *G06F 16/283* (2019.01); *G06F 16/2264* (2019.01); *G06F 16/24532* (2019.01); *G06F 16/278* (2019.01)

(58) Field of Classification Search
CPC ................. G06F 16/283; G06F 16/278; G06F 16/24532; G06F 16/2264
See application file for complete search history.

(56) References Cited

U.S. PATENT DOCUMENTS

| 5,737,600 | A | * | 4/1998 | Geiner | G06F 16/23 |
| 5,892,900 | A | * | 4/1999 | Ginter | H04L 63/20 |
| | | | | | 726/26 |
| 5,915,019 | A | * | 6/1999 | Ginter | H04L 63/16 |
| | | | | | 705/26.1 |
| 5,982,891 | A | * | 11/1999 | Ginter | H04N 21/44204 |
| | | | | | 375/E7.009 |
| 7,095,854 | B1 | * | 8/2006 | Ginter | H04L 9/3247 |
| | | | | | 380/231 |
| 8,191,157 | B2 | * | 5/2012 | Ginter | H04N 21/4627 |
| | | | | | 713/192 |
| 8,776,216 | B2 | * | 7/2014 | Boccon-Gibod | H04L 9/302 |
| | | | | | 726/21 |

(Continued)

FOREIGN PATENT DOCUMENTS

WO WO2007047846 A2 * 4/2007
WO WO2023/039225 A1 * 3/2023

*Primary Examiner* — Daniel A Kuddus
(74) *Attorney, Agent, or Firm* — Thayne and Davis LLC; John P. Davis

(57) ABSTRACT

This disclosure relates to, among other things, scalable data processing, storage, and/or management systems and methods. Certain embodiments disclosed herein provide for a multi-dimensional data storage structure that may facilitate parallel processing of data during both data ingestion and data retrieval and/or access processes involving one or more storage layers In various embodiments, sequence number schemes associated with ingested data records may allow for improved management of data stored in one or more layers (e.g., hot and/or cold data storage layers).

17 Claims, 7 Drawing Sheets

(56) References Cited

U.S. PATENT DOCUMENTS

| | | | | |
|---|---|---|---|---|
| 9,626,667 | B2* | 4/2017 | Boccon-Gibod | H04L 63/10 |
| 10,061,805 | B2* | 8/2018 | Tidwell | G06F 16/2358 |
| 10,817,530 | B2* | 10/2020 | Siebel | H04L 67/53 |
| 2003/0088784 | A1* | 5/2003 | Ginter | G06Q 50/184 |
| | | | | 375/E7.009 |
| 2004/0103305 | A1* | 5/2004 | Ginter | H04L 63/0442 |
| | | | | 375/E7.009 |
| 2004/0268244 | A1* | 12/2004 | Levanoni | G06F 16/8373 |
| | | | | 707/E17.132 |
| 2007/0185815 | A1* | 8/2007 | Boccon-Gibod | H04L 9/0825 |
| | | | | 705/51 |
| 2007/0250937 | A1* | 10/2007 | Ginter | G06F 21/31 |
| | | | | 726/27 |
| 2007/0277031 | A1* | 11/2007 | Ginter | G06Q 20/023 |
| | | | | 713/155 |
| 2013/0124467 | A1* | 5/2013 | Naidu | G06F 16/27 |
| | | | | 707/610 |
| 2016/0248792 | A1* | 8/2016 | Tidwell | G06F 16/245 |
| 2017/0006135 | A1* | 1/2017 | Siebel | G06Q 10/06 |
| 2017/0329957 | A1* | 11/2017 | Vepa | G06F 21/445 |
| 2018/0191867 | A1* | 7/2018 | Siebel | G06N 20/20 |
| 2020/0250328 | A1* | 8/2020 | Swenson | G06F 21/6218 |
| 2020/0364223 | A1* | 11/2020 | Pal | G06F 16/24539 |

* cited by examiner

TIME SERIES DATA MANAGEMENT SYSTEMS AND METHODS

RELATED APPLICATIONS

This application claims the benefit of priority under 35 U.S.C. § 119(e) to U.S. Provisional Patent Application No. 63/281,519, filed Nov. 19, 2021, and entitled "TIME SERIES DATA MANAGEMENT SYSTEMS AND METHODS," the contents of which is hereby incorporated by referenced in its entirety

COPYRIGHT AUTHORIZATION

Portions of the disclosure of this patent document may contain material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

SUMMARY

The present disclosure relates generally to systems and methods for managing data. More specifically, the present disclosure relates to systems and methods for managing time series data using a scalable data processing architecture.

Data applications that produce large volumes of time series data such as, for example and without limitation, Internet-of-Things ("IoT") networks, may benefit from highly scalable solutions for data ingestion, storage, and/or retrieval. Due to hardware scalability constraints and the cost of specialized hardware, scalability is typically built horizontally where the system capacity can be increased by adding relatively low-cost commodity hardware components. Such systems, however, often involve implementing specific software architectures where the work in every stage of the data processing pipeline can be distributed between multiple compute nodes and where storage layers can grow horizontally.

Embodiments of the disclosed systems and methods provide for a data processing and management architecture which may be scalable in multiple processing stages and storage layers. In various embodiments, a multi-dimensional data storage structure may be employed (e.g., a 2-dimensional structure). For example, consistent with various aspects disclosed herein, tabular data may be organized into data partitions comprising time-ordered collections of records, where dimensions comprise an index to data partitions and an index to data segments within partitions. In various embodiments of the disclosed systems and methods, data partitions may not overlap, which may allow for streamlined queries of data records in one or more partitions.

Certain embodiments of the disclosed systems and methods may enable parallel processing of data during both data ingestion and data retrieval and/or access processes. For example, data stored in each partition may be accessed, retrieved, and/or otherwise processed independently, allowing for data operations to proceed in a parallel way. In various embodiments, sequence number schemes associated with ingested data records may allow for management of data stored in one or more layers (e.g., hot and/or cold data storage layers). Sequence numbers associated with data records managed by a service implementing certain embodiments of the disclosed systems and methods may be used in connection with a variety of data operations including, for example and without limitation, data update, data access, and/or data compaction operations. For example, sequence numbers may be used in connection with ingesting and retrieving updates of previously ingested data records, where a data record with a higher sequence number may be retrieved as part of a query to ensure the most up to date record is accessed.

BRIEF DESCRIPTION OF THE DRAWINGS

The inventive body of work will be readily understood by referring to the following detailed description in conjunction with the accompanying drawings, in which.

DETAILED DESCRIPTION

A description of systems and methods consistent with embodiments of the present disclosure is provided herein. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure may be understood by reference to certain drawings. The components of the disclosed embodiments, as generally described and/or illustrated in the figures herein, could be arranged and designed in a wide variety of different configurations. Thus, the following description of the embodiments of the systems and methods of the disclosure is not intended to limit the scope of the disclosure, but is merely representative of possible embodiments of the disclosure. In addition, the steps of any method disclosed herein do not necessarily need to be executed in any specific order, or even sequentially, nor need the steps be executed only once, unless otherwise specified.

Consistent with various embodiments disclosed herein, tabular data may be organized into data partitions comprising time-ordered collections of records. In certain embodiments, a multi-dimensional data storage structure may be employed. In at least one non-limiting example, a data storage structure consistent with certain embodiments disclosed herein may be imagined as a 2-dimensional space, where the first dimension comprises an index to data partitions and the second dimension comprises an index to data segments within each data partition. In certain embodiments and/or implementations, values inside of data segments may be ordered by time.

As discussed in more detail below, sequence numbers associated with ingested data records may allow for streamlined management of data stored in one or more layers (e.g., hot and/or cold data storage layers). Data management operations leveraging sequence numbers may include, for example and without limitation, data update, data access, and/or data compaction operations.

Figure 1:
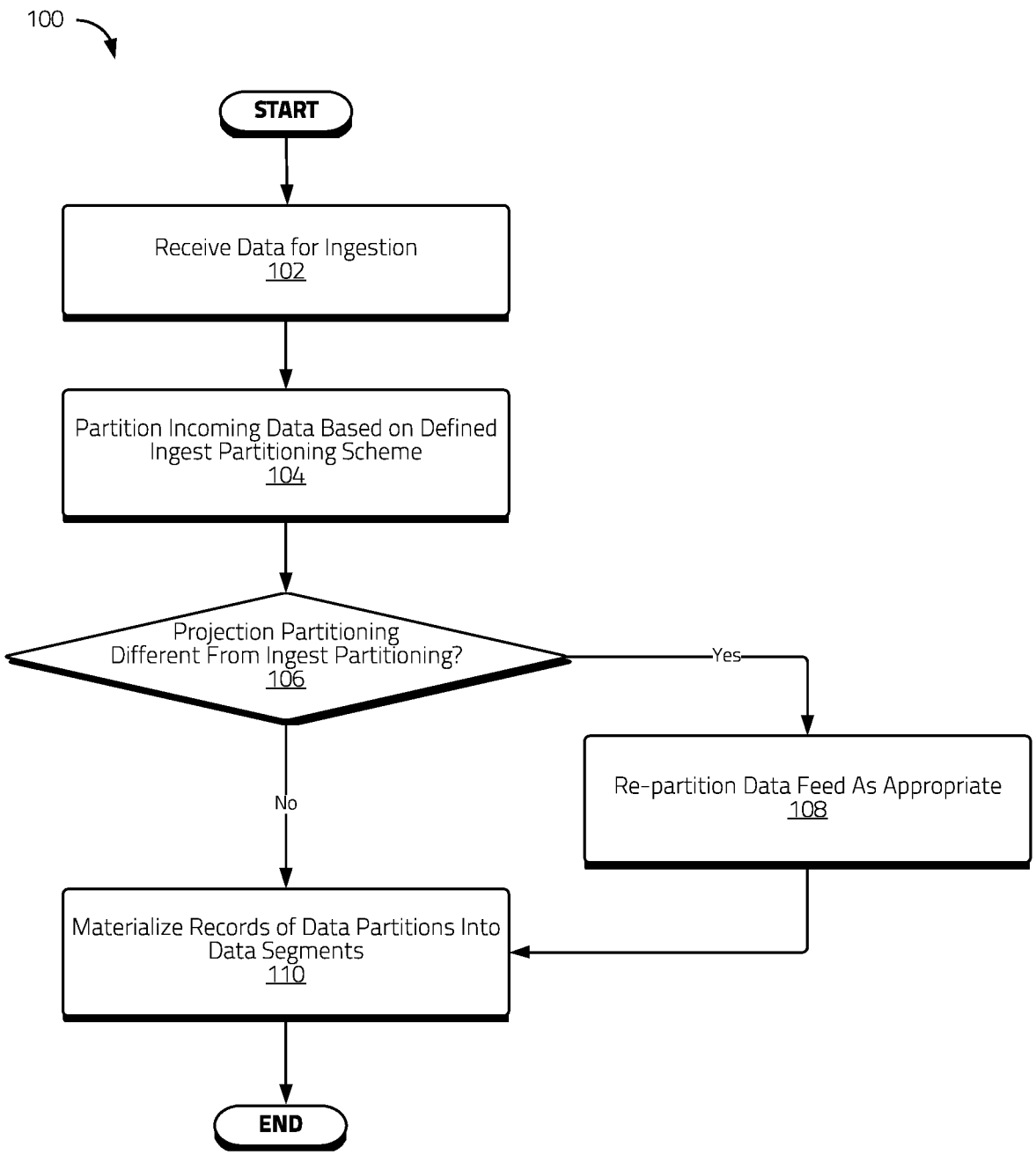
FIG. 1 illustrates a flow chart of a non-limiting example of a data ingestion process consistent with certain embodiments disclosed herein.

FIG. 1 illustrates a flow chart of a non-limiting example of a data ingestion process 100 consistent with certain embodiments disclosed herein. The illustrated process 100 may be implemented in a variety of ways, including using software, firmware, hardware, and/or any combination thereof. In certain embodiments, various aspects of the process 100 and/or its constituent steps may be performed by one or more systems and/or services, including systems and/or services that may implement aspects of a hot data storage layer, a cold data storage layer, a canonical data store, and/or various shared systems and/or services.

At 102, data may be received for ingestion into the data management service. In some embodiments, data received for ingestion may be published into one or more topics, which in some implementations may comprise partitioned topics. The incoming data may be partitioned at 104 based on an ingest partitioning scheme.

In some embodiments, the partitioning scheme may comprise a defined partitioning scheme. For example and without limitation, in some embodiments, a definitions metastore associated with various systems and/or services of a data storage service may, among other things, define one or more partition schemes for data ingested into the service. One or more of these defined data partitioning schemes may be used in connection with partitioning incoming data. Among other things, data ingest partitioning consistent with various aspects of the disclosed embodiments may facilitate ingestion and processing of an incoming data feed in a massively parallel way.

During data ingestion, new data partitions may be detected by determining whether a particular data partition already exists in the database via a lookup process. If the data partition does not exist, a new data partition may be added to the database. In some embodiments, to improve data ingestion performance, such lookup processes may be relatively fast and, in certain implementations, may be executed in memory. For example, if the incoming data feed is partitioned, relative partition index subsets may be identified and stored in the memory of a given compute node, facilitating relatively fast lookups.

In some embodiments, it may be determined at 106 whether the projection partitioning differs from the ingest partitioning. If the projection partitioning differs from the ingested data, the data feed may be repartitioned as appropriate at 108. For example, the data feed may be repartitioned based on a defined partitioning scheme that, in some embodiments, may be defined within a definitions metastore. Records of data partitions may then be materialized into data segments at 110 consistent with various data partitioning and segmentation schemes disclosed herein.

Figure 2:
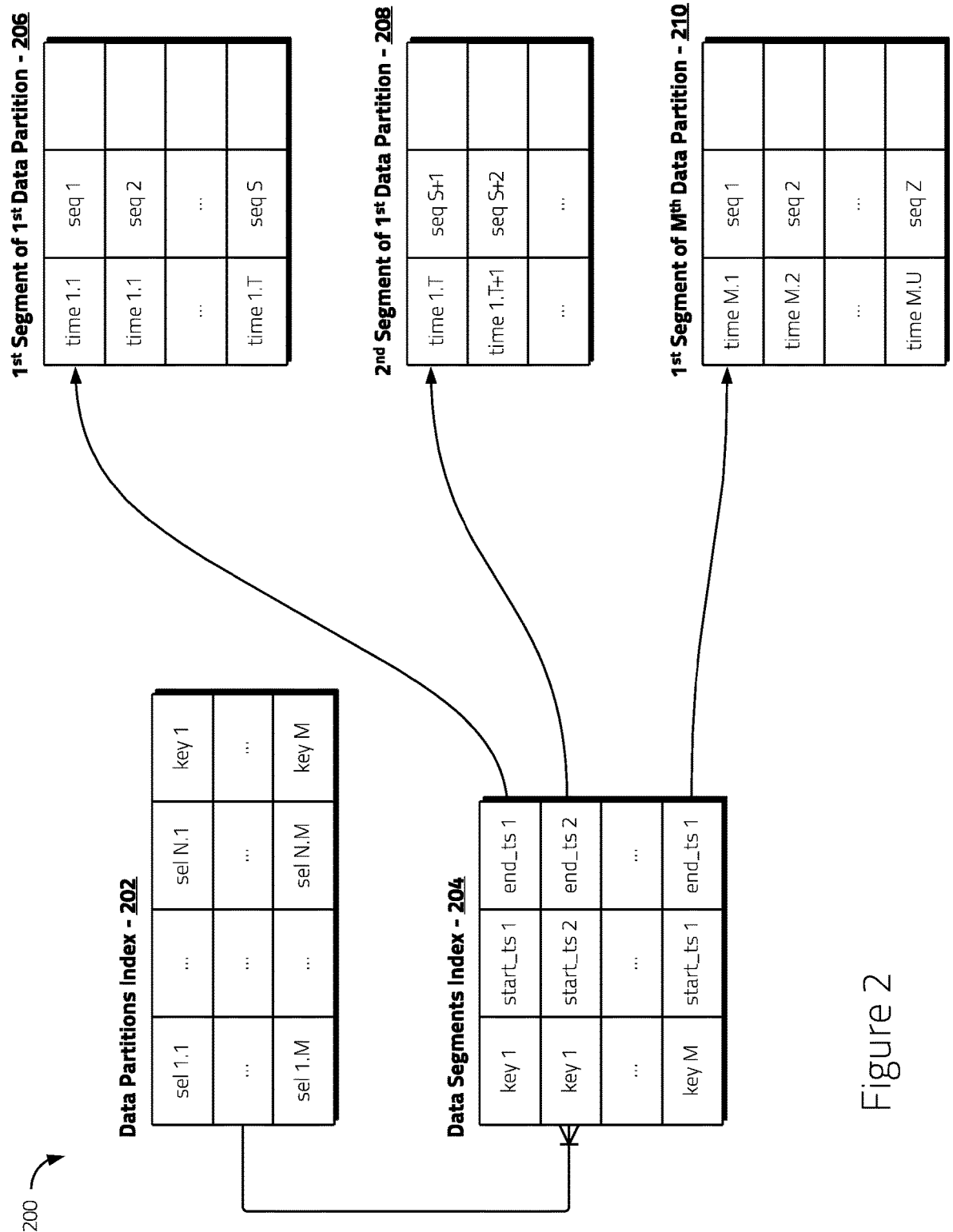
FIG. 2 illustrates a non-limiting example of a multi-dimensional data management structure using data partitions and data segments consistent with certain embodiments disclosed herein.

FIG. 2 illustrates a non-limiting example of a multi-dimensional data management structure 200 using data partitions and data segments consistent with certain embodiments disclosed herein. As illustrated, ingested data may be organized in a multi-dimensional space with a first dimension comprising an index to data partitions 202 and a second dimension comprising an index to data segments 204 within data partitions. In many embodiments, data and/or entries within data segments may be time ordered.

In some embodiments, a data table may comprise columns, from which a subset of columns may be selected for calculating data partitioning keys. In some implementations, these columns of a data table may comprise entries that may be referred to as selectors. Selectors may be associated with a given partitioning scheme (which may be referred to in certain herein as a data projection and/or derivatives of the same). In some embodiments, data partition keys may be calculated as a function of certain data values included in a data table (e.g., a hash function). As illustrated in connection with FIG. 2, selectors may be included in a data partitions index 202 associated with data partition keys.

The data segments index 204 may associate data partition keys with specific timestamp ranges. As shown, a data partition key may be associated with multiple segments of a particular data partition (e.g., data partition key key 1 may be associated with data segments 206, 208). In some instances, a data partition key may be associated with a single segment of a data partition (e.g., data partition key key M may be associated with data segment 210).

In certain circumstances, multiple records may exist that are associated with the same timestamp. For example, in the illustrated example, records with timestamp 1. T may exist in the both the first and the second segments of the first data partition 206, 208. Consistent with various embodiments disclosed herein, ingested records and/or data may be associated with a sequence number. Multiple records associated with the same timestamp may be differentiated based on associated sequence numbers. In some embodiments, sequence numbers may be globally unique and increase monotonically. In further embodiments, sequence numbers may be unique within a given data partition. In the event there are duplicate records in the system, during data retrieval and/or querying processes, duplicate records may be filtered out so that only the data and/or record with the highest sequence number is returned. In certain embodiments, additional table columns may be associated with a data record to allow for additional information to be associated with the record and be used in connection with record differentiation.

Sequence numbers associated with data records may be used in connection with a variety of data operations including, for example and without limitation, data update, data access, and/or data compaction operations. For example, as noted above, sequence numbers may be used in connection with ingesting and retrieving updates of previously ingested data records, where a data record with a higher sequence number may be retrieved as part of a query to ensure the most up to date record is retrieved. For example, as illustrated in connection with FIG. 2, a data record associated with timestamp time 1.1 in segment 206 may be associated with sequence number seq 1. An update to the data record, also associated with timestamp time 1.1, may be ingested and stored in segment 206. To distinguish this updated data record from the original data record associated with timestamp time 1.1, the updated data record may be assigned sequence number seq 2. In a data retrieval and/or other data processing and/or management operation, the record with the greater sequence number—that is, sequence number seq 2—would be retrieved and/or otherwise considered the most up to date data record.

In at least one non-limiting example, a data table may comprise columns $col_1$, $col_2$, $col_3$, $col_4$, where $col_2$ and $col_3$ are the selectors for projection $p_1$ and a record $r_N$ is a collection of tuples of column identifier and value $((id(col_1), val_{1N}), (id(col_2), val_{2N}), (id(col_3), val_{3N}), (id(col_4), val_{4N}))$. The data partitioning key in projection $p_1$ for record $r_N$ may be calculated based on $key_N = f(val_{2N}, val_{3N})$ where $f()$ is the data partition key calculation function (e.g., a hash function). In some embodiments, for processing or storing data partitions in P partitions, the relevant processing/storage partition index can be calculated as $hash(key_N)$ mod P.

Sequence numbers consistent with various aspects of the disclosed systems and methods may allow for streamlined data updates and/or retrieval operations. In addition, as in some implementations original data may not be deleted when updates are received (and in some embodiments may be assigned higher sequence numbers), use of sequence numbers consistent with various aspects of the disclosed embodiments may facilitate data auditing and/or other methods of inspecting data record history, provenance, and/or the like. As original data may not be immediately deleted (and/or may be configured to be retained in perpetuity and/or for some length of time depending on how data cleanup and/or deduplication processes are configured), use of sequence numbers consistent with aspects of the disclosed embodiments may provide data record versioning and/or backup functionality, where data records with lower sequence numbers may be accessed to access prior versions of data records.

Figure 3:
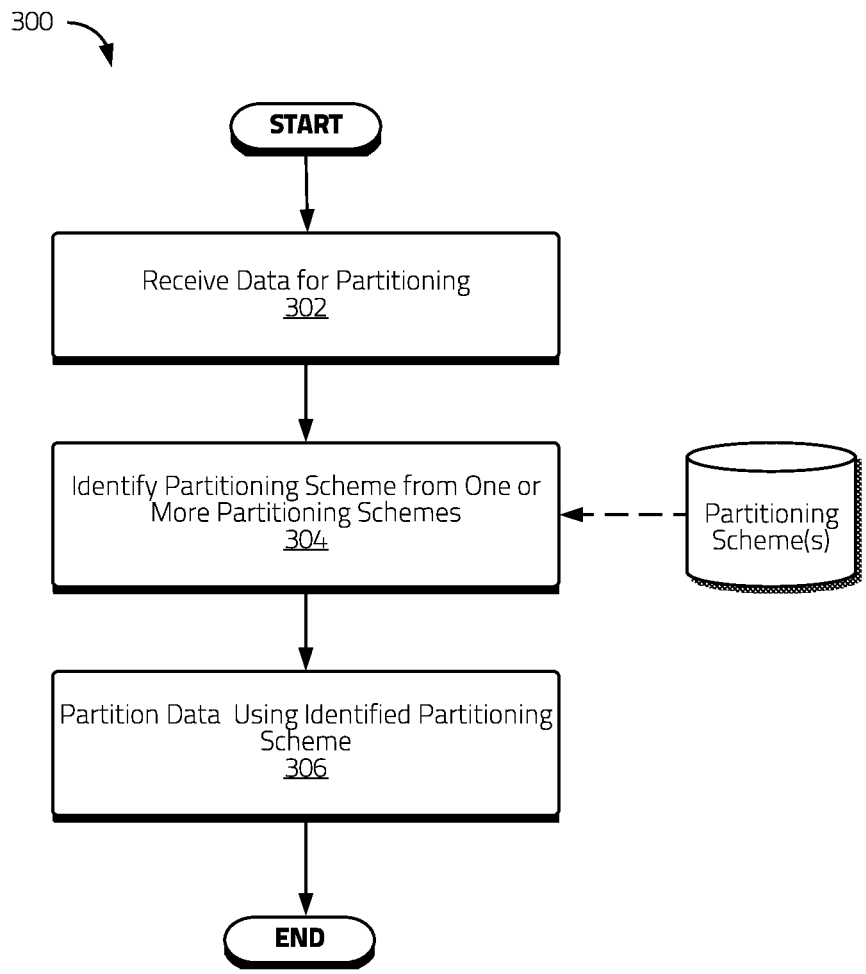
FIG. 3 illustrates a flow chart of a non-limiting example of a dynamic data partitioning process consistent with certain embodiments disclosed herein.

FIG. 3 illustrates a flow chart of a non-limiting example of dynamic data partitioning process consistent with certain embodiments disclosed herein. The illustrated process 300 may be implemented in a variety of ways, including using software, firmware, hardware, and/or any combination thereof. In certain embodiments, various aspects of the process 300 and/or its constituent steps may be performed by one or more systems and/or services, including systems and/or services that may implement aspects of a hot data storage layer, a cold data storage layer, a canonical data store, and/or various shared systems and/or services.

Embodiments of the disclosed systems and methods allow for defining multiple different data partitioning schemes (i.e., projections) to provide improved retrieval and/or filtering for different requests and/or query patterns. In some embodiments, statistics and/or other relevant information about column values' cardinalities and/or value distribution may be collected for selection (potentially automatic selection) of a projection (e.g., an optimal projection in some implementations) for a given query.

As illustrated in FIG. 3, at 302, data records may be received for partitioning and storage within a data storage and management service consistent with various embodiments disclosed herein. A partitioning scheme for the received data may be identified at 304 from one or more data partitioning schemes. In some embodiments, the one or more possible partitioning schemes may be defined in a definitions metastore.

In some embodiments, the identified partitioning scheme may comprise a scheme that provides improved retrieval and/or filtering of data for expected and/or actual data requests and/or query patterns. In certain embodiments, the partitioning scheme providing improved data management for a particular dataset may be manually configured by a user and/or administrator. For example, a user and/or administrator may have a notion of expected query patterns and potentially optimal partitioning schemes and may configure the service so that data received for partitioning is partitioned in accordance with the optimal partitioning scheme(s).

In further embodiments, the partitioning scheme providing improved data management for a particular dataset may be dynamically selected, potentially automatically by the data management service. For example, statistical and/or other relevant information about the data received for partitioning may be used in connection with automatically selecting a partitioning scheme from one or more available partitioning schemes that proves to be an optimal projection for the expected queries on the data.

In some embodiments, predictive methods may be used to identify expected query patterns against a dataset, which may depend in part on an analysis of the dataset itself. In further embodiments, a partitioning scheme from one or more available partitioning scheme may be selected based on actual and/or historical queries on a dataset and/or similar datasets. In yet further embodiments, data partitioned in accordance with an initial partitioning scheme may be repartitioned based on changes and/or deviations from expected query patterns to better reflect an optimal partitioning scheme for actual queries against the data. In this manner, an improved and/or otherwise optimal partitioning scheme may change over time and be implemented via repartitioning processes.

In at least one non-limiting example illustrating relationships between an optimal data partitioning scheme and/or projection and an associated query, a time series database may store data from sensors associated with vehicles. This data may comprise current speed, fuel levels, locations, loads, distance traveled, and/or the like. Each vehicle may be identified by an identifier, model, a fleet it belongs to, and/or the like.

Non-limiting examples of data queries against this database may include:

Example Query 1: Retrieve data for a single vehicle for a given time period.

Example Query 2: Retrieve data for all vehicles which are currently loaded more than 90%.

Example Query 3: Retrieve aggregated data (e.g., total distance traveled, total fuel consumed, etc.) for a single vehicle model for a given time period.

For the above query examples, the following data partitioning schemes and/or projections may be optimal:

Example Query 1 Data Partition Scheme: Data may be partitioned by vehicle identifier. For such a query, the system may first identify a single data partition and then, according to the given time period, data from relevant segments of this data partition may be fetched. This may allow the system to execute a large number of such "lightweight" queries in parallel.

Example Query 2 Data Partition Scheme: Data may be partitioned by vehicle identifier. This query may involve retrieving the last load sensor reading from all vehicles and then the records with vehicle loads exceeding 90% of max load may be returned. This relatively "heavy" query may involve fetching data from all vehicles. Embodiments of the time series databases disclosed herein may allow for data fetching from data partitions in a massively parallel way and the records within each data partition may be stored by time, which makes it possible to fetch the most recent records from any given data partition. This may improve the performance of responding to such a type of query.

Example Query 3 Data Partition Scheme: Data may be partitioned by vehicle model. For an identified single data partition, data from segments relevant for a given time period may be fetched. Although the amount of data may be relatively large, which may then need to be processed, the number of data segments for a given time period may be limited and each identified data segment may be processed in parallel. Fetched data may be aggregated as needed to respond to the query.

Figure 4:
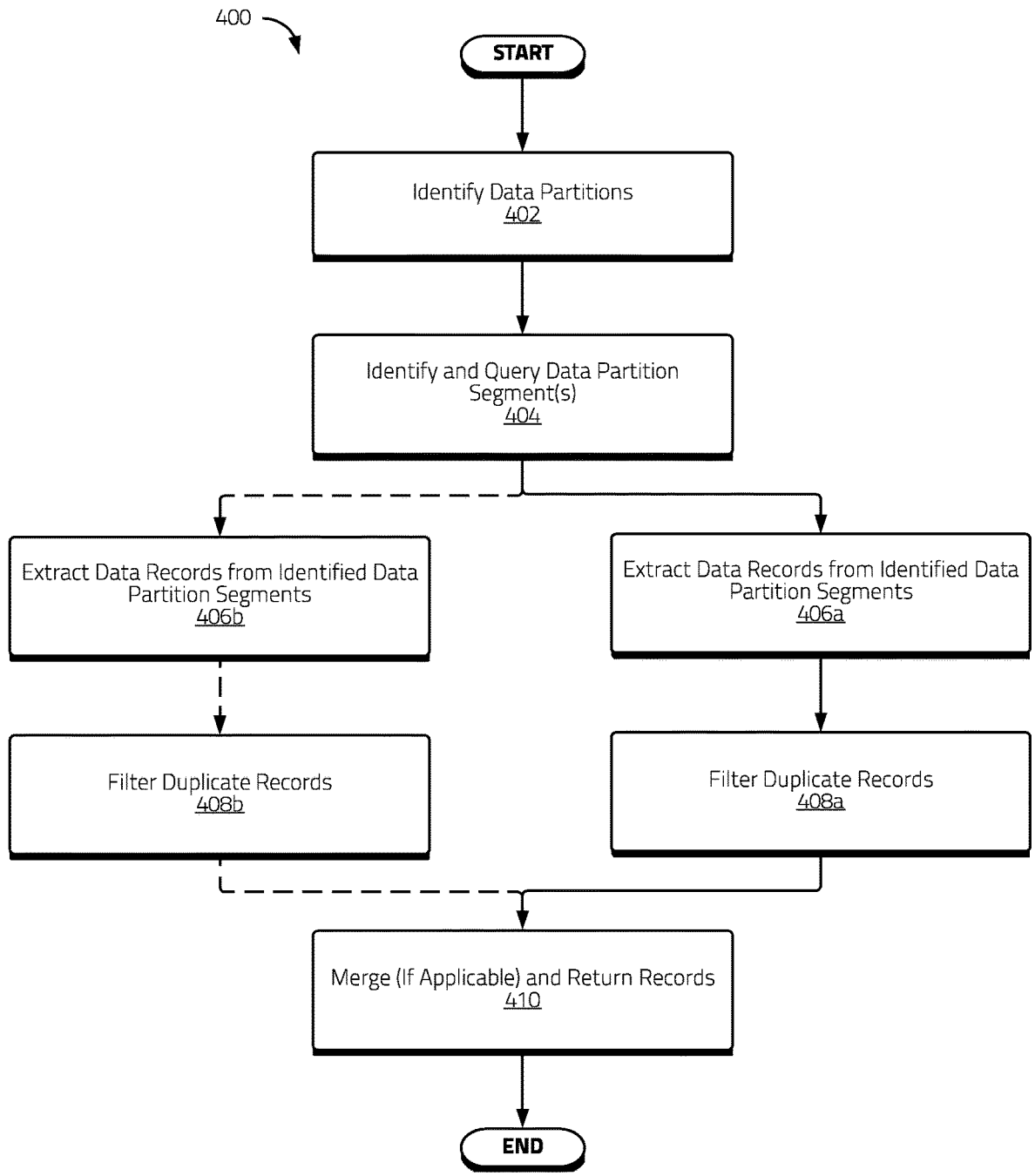
FIG. 4 illustrates a flow chart of a non-limiting example of a data query process consistent with certain embodiments disclosed herein.

FIG. 4 illustrates a flow chart of a non-limiting example of data query process 400 consistent with certain embodiments disclosed herein. The illustrated process 400 may be implemented in a variety of ways, including using software, firmware, hardware, and/or any combination thereof. In certain embodiments, various aspects of the process 400 and/or its constituent steps may be performed by one or more systems and/or services, including systems and/or services that may implement aspects of a hot data storage layer, a cold data storage layer, a canonical data store, and/or various shared systems and/or services.

In some embodiments, when querying data, a data partition, which in some embodiments may be structured in accordance with an identified improved and/or otherwise optimal partitioning scheme and/or projection, may be selected. In some embodiments, and/or implementations, if multiple projections associated with a data query exist, a most optimal projection of the multiple projections for executing a given query may be used. From this selected projection, relevant data partitions may be identified at 402 by applying selector constraints to a data partition index associated with the projection.

After identifying relevant data partitions at 402, records may be queried from relevant segments in the identified partitions at 404 the partitions to determine whether they include records associated with the data query parameters. In some embodiments, when multiple data partitions and/or segments are identified and/or otherwise detected, as illustrated in FIG. 4, queries to multiple data partitions for relevant records may proceed in parallel (at least in part). Relevant data segments associated with the one or more data partitions may be detected by applying one or more time constraints to a segment index.

Records from data segments may be extracted and potentially filtered at 406a (and/or 406b if multiple partitions/segments are queried, which may proceed in parallel). For example, records may be extracted and filtered from segments by pushing filter constraints—which may include time constraints—into lower-level data retrieval components at 408a (and/or 408b if multiple partitions/segments are queried). Duplicate records may be filtered using sequence numbers as described above (e.g., filtered so that the data and/or record with the highest sequence number is returned). Finally, the records returned from every queried data partition process may be merged and returned in response to the received data query at 410.

Embodiments of the disclosed systems and methods may be implemented in a variety of ways. For connecting various data processing pipeline components, a partitioned messaging system like Apache Kafka may be used. For storing a data partition index, a relational database such as, for example and without limitation PostgreSQL, may be used, which may allow for filtering relevant data partitions by a wide variety of selector constraint types. For storing a data segment index, a relational database such as, for example and without limitation PostgreSQL, may be used.

In some embodiments, data segments may be stored in an object store such as, for example and without limitation AWS S3, in columnar format files (e.g., Apache Parquet). In certain implementations, columnar representation may allow relatively compressed storage and/or fast data retrieval. In further embodiments, data records may be stored in a key-ordered key value store such as, for example and without limitation, Apache Cassandra and/or Apache HBase. In such implementations, separation to data partitions and/or data segments may be virtual. That is, the records may need not be physically separated into independent data partitions and/or segments. In some embodiments, data records may be stored in a suitable combination of object stores and/or key-ordered key value stores.

Figure 5:
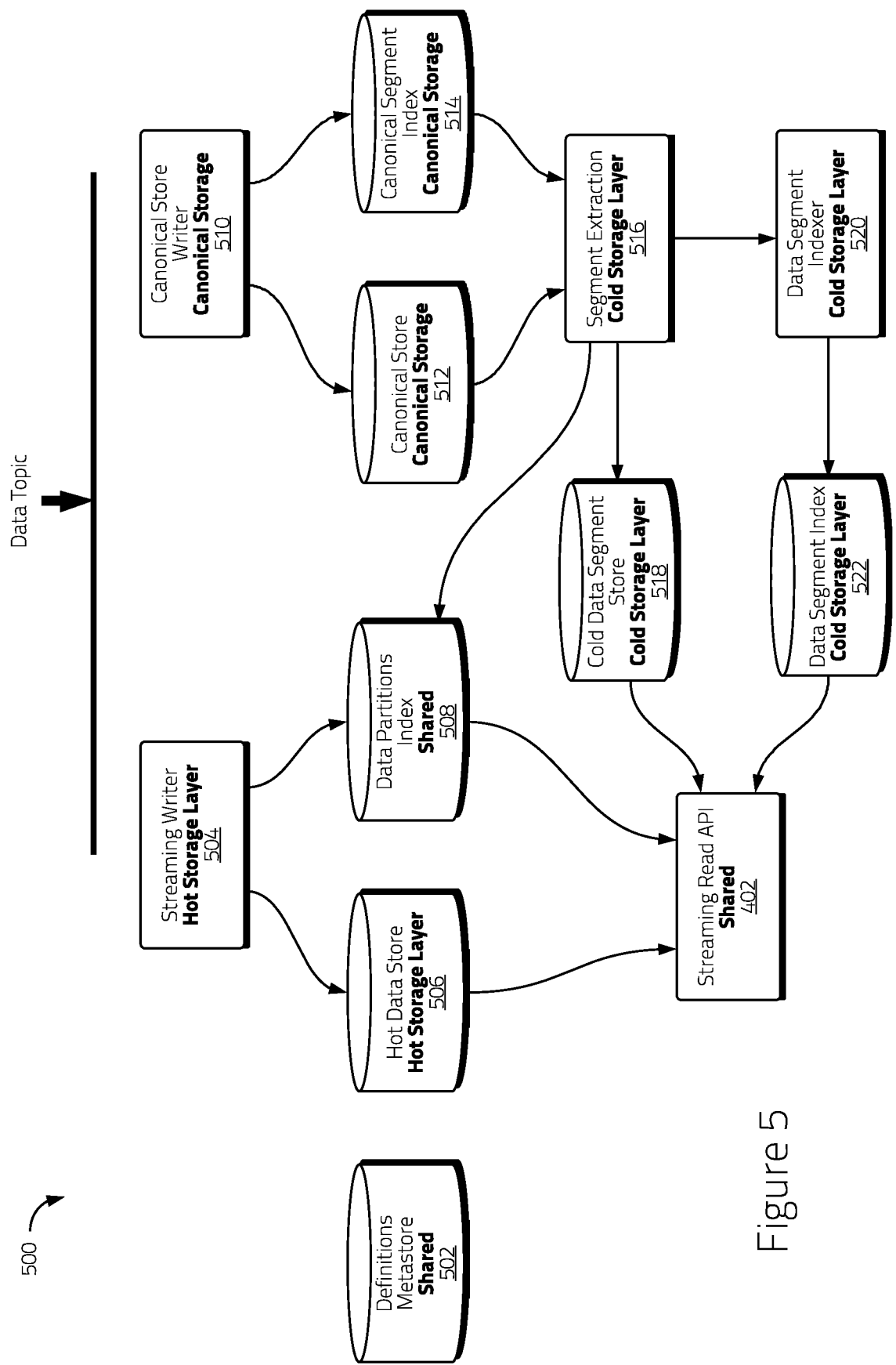
FIG. 5 illustrates a non-limiting example of a data management architecture consistent with certain embodiments disclosed herein.

FIG. 5 illustrates a non-limiting example of a data management architecture 500 consistent with certain embodiments disclosed herein. As shown, the architecture 500 may comprise systems, services, and/or components associated with a hot storage layer and a cold storage layer. The architecture 500 may further comprise systems, services, and/or components shared between the hot and cold storage layers and systems, services, and/or components associated with canonical storage.

As discussed above, various embodiments of the disclosed systems and methods may use shared information included in a definitions metastore 502. The definitions metastore 502 may provide definitions relating to namespaces, which may allow for different users to operate on and/or process data in a particular table while operating in different namespaces. In some embodiments, information included the definitions metastore 502 may be used to grant access rights based on namespaces (e.g., by an access management system and/or service). For example, users may be granted privileges to access certain data tables and be restricted from accessing certain other data tables.

The definitions metastore 502 may further provide definitions relating to data tables, which may define the logical structure of data tables stored and/or otherwise managed by the service. Definitions relating to data tables may comprise, for example and without limitation, information relating to table elements and/or columns, data types, and/or the like. In some embodiments, the definitions metastore 502 may further provide information relating to one or more partitioning schemes and/or projections supported by the data management service.

In some embodiments, the definitions metastore 502 may provide definitions relating to storage levels and/or layer information for data. For example, definitions may be provided regarding whether and/or what data should be stored in a hot storage layer, a cold storage layer, both storage layers, and/or the like, retention periods for stored data, which in some implementations may differ depending on the layer, update information for the hot and/or cold storage layers, criteria for data compaction operations, and/or the like. In this manner, information included in the definitions metastore 502 may help define the logical structure of data, how it should be partitioned by the service, how it should be written to storage, etc.

The hot storage layer may comprise a streaming writer 504 and a hot data store 506. Data ingested into the data storage and management service may be published into one or more partitioned topics, which in some implementations may comprise partitioned Kafka topics. In some embodiments, each message published to a topic may have a sequence number within an associated partition. For example, each message published to a Kafka topic may have an offset within a given Kafka topic partition, which may function as a sequence number and/or indicator for various data management operations consistent with embodiments disclosed herein. In some embodiments, the data storage and management service may expose a REST API that may allow external systems and/or services to insert data records into the data storage and/or management service.

From each topic, data may be consumed by a streaming writer 504. In certain embodiments, the streaming writer 504 may be configured to detect which data partition an incoming data record belongs to and may store the record within the proper data partition key into the hot data store 506, which in some implementations may comprise a Cassandra key-value database. The streaming writer 504 may further detect new data partitions from the ingested data records, potentially repartitioning the ingested data if needed (e.g., based on information included in the definitions metastore 502), add the data portions to a data partitions index 508 (if needed), which may be shared between the hot storage and cold storage layers, and then store the record with the new data partition key in the hot data store 506.

In certain embodiments, sequence numbers may be assigned during the data ingestion process (e.g., assigned by the streaming writer 504). In various embodiments, sequence numbers may be globally unique and/or increase monotonically. In further embodiments, sequence numbers may be monotonically increasing and/or unique within a given data partition. In some implementations, data associated with topics ingested by the service by be associated with unique offset numbers within a given topic partition (e.g., as may be in the case with Kafka topics), which may be used as and/or otherwise associated with sequence numbers consistent with various aspects of the disclosed embodiments.

In certain embodiments, data stored in the hot data store 506 may be associated with a time-to-live ("TTL") specifying a time and/or period that the data should be kept in the hot data store 506. In some embodiments, this information may be specified in the definitions metastore 502. For example, in connection with a hot data store 506 implemented using an Apache Casandra database, the relevant Cassandra table may have TTL set according to a user-specified configuration.

A canonical storage layer may comprise a canonical store writer 510, a canonical store 512, and a canonical segment index 514. Data ingested into the data storage and management may be provided to the canonical store writer 510. The canonical store writer 510 may consume received topic record data, process the data, and/or store the data in a canonical store 512. The canonical store 512 may, in some embodiments, comprise a cloud-based storage service such as, for example and without limitation, AWS S3.

Files written to the canonical store 512 may be associated with a record added to the canonical segment index 514, which may provide index information relating to records stored in the canonical store 512. Data stored in the canonical store 512 may be used in connection with various cold layer storage operations, as discussed in more detail below, partitioning and/or repartitioning operations, data backup operations, and/or the like.

In some embodiments, the cold storage layer may comprise a segment extraction service 516, a cold data segment store 518, a data segment indexer 520, and a data segment index 522. Consistent with various disclosed embodiments, data stored in the canonical store 512 and/or index information included in the canonical segment index 514 may be used to build data records within the cold storage layer. For example and without limitation, the segment extraction service 516 may interact with the canonical store 512 and/or the canonical segment index 514 to access data from the canonical store 512, potentially process the data, and store the data within the cold data segment store 518. When data is stored in the cold data segment store 518, the segment extraction service 516 may interact with the data segment indexer service 520 to generate one or more records in a data segment index 522 associated with the data stored in the cold data segment store 518.

In various embodiments, the segment extraction service 516 may store data in the cold data segment store 518 based, at least in part, on information included in the definitions metastore 502. For example, the definitions metastore 502 may include information relating to cold data storage layer data storage and/or update scheduling, which may comprise information relating to update period, update frequency, update data amount thresholds, and/or the like. This information may be used by the segment extraction service 516 to schedule data recordation actions and/or updates from the canonical store 512 to the cold data segment store 518. For example and without limitation, the definitions metastore 502 may include update scheduling information indicating that the cold storage layer should be updated daily. Records added to the canonical store 512 in the day period may then be retrieved by the segment extraction service 516, partition the records in accordance with a partitioning scheme (which may be defined by information included in the definitions metastore 502), and then write the partitioned data to the cold data segment store 518. In some embodiments, data stored in the cold data segment store 518 may comprise columnar files.

In some embodiments, data written to the cold data segment store 518 may be divided between time periods, which may be referred to in certain instances herein as time buckets, so that data of a single data partition associated with timestamps belonging to a given time period are stored in the same time bucket. This may, among other things, facilitate streamlined data retrieval and/or management operations. For example, in connection with data retrieval over a specific time range, time bucket information may be used to quickly identify data segments for retrieval.

Data written to the cold data segment store 518 may be associated with one or more records included in a data segment index 522. For example, when a data record is recorded to the cold data segment store 518 by the segment extraction service 516, the segment extraction service 516 may interact with a data segment indexer 520 to add an index record to the data segment index 522 associated with the data record.

In at least one non-limiting example, the segment extraction service 516 may be implemented using Apache Spark and the cold data segment store 518 may be implemented using Parquet and/or AWS S3 storage. To populate the cold data segment store 518, a Spark job may be launched by the segment extraction service 516, potentially on a periodic basis (e.g., on a user-specified periodic basis). The Spark job may produce a new data segment for storage by the cold data segment store 518 as a Parquet file for defined data partitions and time buckets. The segment may be stored in AWS S3 storage and relevant entry may be added to the data segment index 522 by the data segment indexer 520. Another Spark job (e.g., a periodic Spark job) may be executed to implement segment compaction for datasets, which may in some implementations meet user-specified compaction criteria.

In various embodiments, use of a canonical storage layer in conjunction with a cold storage layer consistent with certain aspects of the disclosed systems and methods may allow for certain optimized data, processing, management, retrieval, and/or query functionality. For example and without limitation, the canonical store 512 may store record data in a compacted form, but the partitioning and/or division of data and use of time buckets in connection with the cold data segment store 518 may provide certain data processing, retrieval, management, and/or querying efficiencies not realized directly by the canonical storage layer.

In certain embodiments, the definitions metastore 502 may comprise information used by various systems, services, and/or components of the disclosed service to determine which ingested topics should be recorded by the hot data storage layer and the canonical store (and by extension, the cold data storage layer). For example, in some embodiments, the streaming writer 504 and the canonical store writer 510 may use information included in the definitions metastore 502 to determine which ingested data should be recorded in the hot data store 506 and/or the canonical store 512.

In at least one non-limiting example, based on information included in the definitions metastore 502, an entire incoming data stream may be ingested for storage by the canonical store writer 510 for storage in the canonical store 512 (and/or the cold data storage layer), but only a subset of data may be ingested by the streaming writer 504 for storage hot data store 506. In some embodiments, the subset may be associated with particular data topics, tables, and/or associated projections. For example, the definitions metastore 502 may include information directing that the streaming writer 504 process incoming data associated with a particular topic for storage in the hot data store 506 (e.g., if there is a hot storage materialization defined for the incoming topic and/or the like). It will be appreciated, however, that the definitions metastore 502 may comprise information specifying a variety of other ways that data included in a data stream be processed and/or otherwise ingested by the canonical store writer 510 and/or the streaming writer 504. For example, in some implementations, the definitions metastore 502 may comprise information specifying that all incoming data may be ingested by both the hot storage layer and the canonical storage layer.

In various embodiments, data stored in the canonical store 512 may be used in connection with data restoration and/or backup operations. For example, if data is deleted from the hot storage layer and/or the cold storage layer but remains stored in the canonical store 512, it may be restored to the hot storage layer and/or the cold storage layer from the canonical store 512.

In various embodiments, data stored in the canonical store 512 may be used in connection with data repartitioning operations. For example and without limitation, the data storage and/or management service and/or a user thereof may determine that it is advantageous to repartition data stored in the cold storage layer from the original materialized projection (e.g., based on how the data in the cold storage layer is being queried or the like). Using the data stored in the canonical store 512, the data may be repartitioned and stored in the cold data storage layer consistent with the updated projection. It will be appreciated that a variety of other events triggering a repartitioning of data in the cold data storage layer may be used in connection with various aspects of the disclosed embodiments.

When retrieving data from the service, a streaming read API 524 may be queried with relevant query information (e.g., identifying data partitions and/or time periods). The streaming read API 524 may query the hot and cold storage layers based on the identified data partitions and/or time periods. In some embodiments, low level data retrieval components may apply filters to the fetched data. The time-ordered sequences of records belonging to data partitions fetched from both layers may be processed by a deduplicator, where records having the same primary key but lower sequence number may be discarded. Then records from different data partitions may be merged into single result and optional post-processing like sorting or aggregation may be executed.

Figure 6:
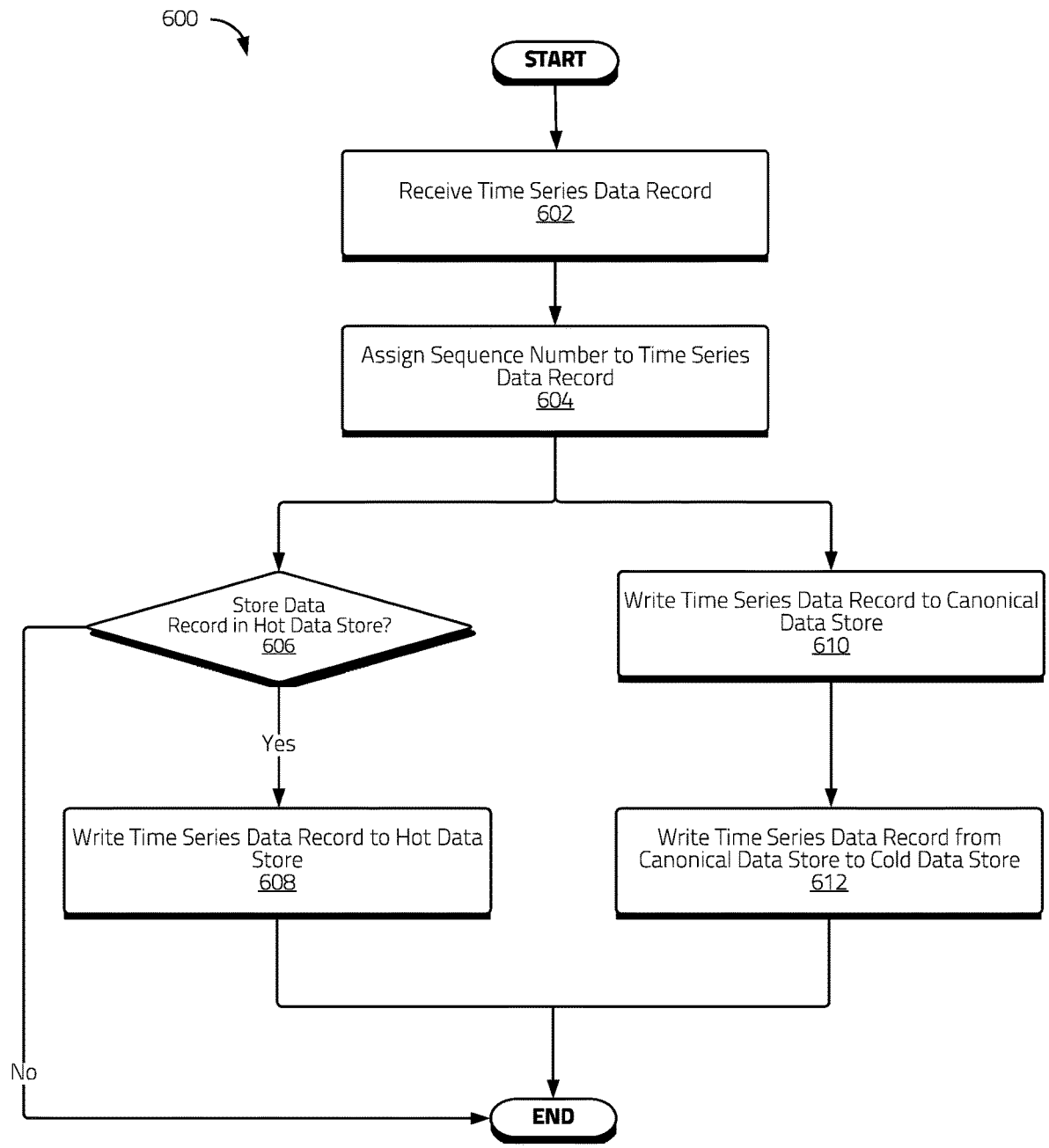
FIG. 6 illustrates a flow chart of a non-limiting example of a data storage and/or management process consistent with certain embodiments disclosed herein.

FIG. 6 illustrates a flow chart of a non-limiting example of a data storage and/or management process 600 consistent with certain embodiments disclosed herein. The illustrated process 600 may be implemented in a variety of ways, including using software, firmware, hardware, and/or any combination thereof. In certain embodiments, various aspects of the process 600 and/or its constituent steps may be performed by one or more systems and/or services, including systems and/or services that may implement aspects of a hot data storage layer, a cold data storage layer, a canonical data store, and/or various shared systems and/or services.

At 602, a first time series data record included in a time series data stream may be received by a data management service system. In some embodiments the first time series data record may be associated with a first data topic (e.g., a Kafka topic) and may comprise a first timestamp. In certain embodiments, the first time series data record may further comprise and/or otherwise be associated with a topic offset number.

A first sequence number may be assigned to the first time series data record at 604. In some embodiments, the first sequence number may comprise and/or otherwise be based on the topic offset number associated with the first time series data record. Consistent with various disclosed embodiments, the first sequence number may comprise a number that is unique to the first data partition and is greater than sequence numbers assigned to prior ingested data records (i.e., that is, sequence numbers may monotonically increase).

At 606, a determination may be made by a streaming writer service based on information accessed from a shared definitions metastore whether the first time series data record should be written to a partition in a hot data store. For example, the definitions metastore may provide an indication as to what data topics should be written to the hot data store. If the record should be written to the hot data store, the method 600 may proceed to 608, and the streaming writer may write the first time series data record to a first data partition included in the hot data store. In some embodiments, the first data partition may be associated with the first data topic. In further embodiments, a shared data partitions index may be updated to reflect the writing of the first time series data record to the hot data store.

The first time series data record may be further written to a canonical data store by a canonical store writer service at 610. In some embodiments, a canonical segment index may be updated after writing the first time series data record to the canonical data store. At 612, the first time series data record may be written from the canonical store to a cold data store by a segment extraction service based, at least in part, on information accessed from the definitions metastore. In certain embodiments, a cold storage later data segment index may be updated after writing the first time series data record to the cold data store. In various embodiments, the hot data store, cold data store, and/or the canonical data store may comprise remote and/or otherwise cloud based data store services accessed by and/or otherwise manageable by the data management service system.

In some embodiments, a second time series data record may be received. The second time series data record may comprise an update to the first time series data record, and thus may be associated with the same data topic and/or timestamp. Consistent with various disclosed embodiments, the second time series data record may be assigned a higher sequence number, which may be used to return the second record to a querying system in the event a record associated with the timestamp is requested.

Figure 7:
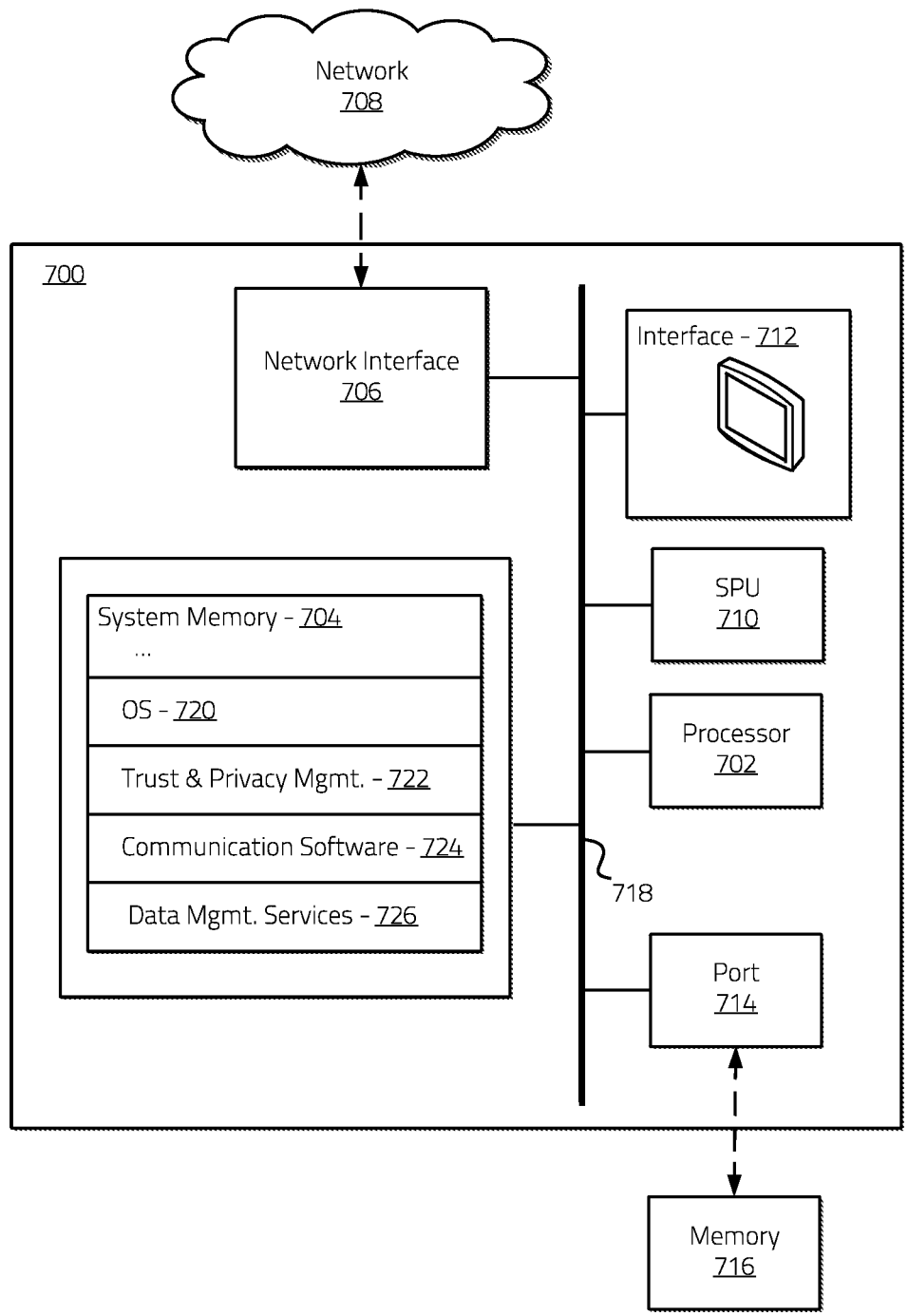
FIG. 7 illustrates a non-limiting example of a system that may be used to implement certain embodiments of the systems and methods of the present disclosure.

FIG. 7 illustrates an example of a system 700 that may be used to implement certain embodiments of the systems and methods of the present disclosure. The various systems, services, and/or devices used in connection with aspects the disclosed embodiments may be communicatively coupled using a variety of networks and/or network connections (e.g., network 708). In certain embodiments, the network 708 may comprise a variety of network communication devices and/or channels and may utilize any suitable communications protocols and/or standards facilitating communication between the systems and/or devices.

The network 708 may comprise the Internet, a local area network, a virtual private network, and/or any other communication network utilizing one or more electronic communication technologies and/or standards (e.g., Ethernet or the like). In some embodiments, the network 708 may comprise a wireless carrier system such as a personal communications system ("PCS"), and/or any other suitable communication system incorporating any suitable communication standards and/or protocols. In further embodiments, the network 708 may comprise an analog mobile communications network and/or a digital mobile communications network utilizing, for example, code division multiple access ("CDMA"), Global System for Mobile Communications or Groupe Special Mobile ("GSM"), frequency division multiple access ("FDMA"), and/or time divisional multiple access ("TDMA") standards. In certain embodiments, the network 708 may incorporate one or more satellite communication links. In yet further embodiments, the network may utilize IEEE's 802.11 standards, Bluetooth®, ultra-wide band ("UWB"), Zigbee®, and or any other suitable standard or standards.

The various systems and/or devices used in connection with aspects of the disclosed embodiments may comprise a variety of computing devices and/or systems, including any computing system or systems suitable to implement the systems and methods disclosed herein. For example, the connected devices and/or systems may comprise a variety of computing devices and systems, including laptop computer systems, desktop computer systems, server computer systems, distributed computer systems, smartphones, tablet computers, and/or the like.

In certain embodiments, the systems and/or devices may comprise at least one processor system configured to execute instructions stored on an associated non-transitory computer-readable storage medium. As discussed in more detail below, systems used in connection with implementing various aspects of the disclosed embodiments may further comprise a secure processing unit ("SPU") configured to perform sensitive operations such as trusted credential and/or key management, cryptographic operations, secure policy management, and/or other aspects of the systems and methods disclosed herein. The systems and/or devices may further comprise software and/or hardware configured to enable electronic communication of information between the devices and/or systems via a network using any suitable communication technology and/or standard.

As illustrated in FIG. 7, the example system 700 may comprise: a processing unit 702; system memory 704, which may include high speed random access memory ("RAM"), non-volatile memory ("ROM"), and/or one or more bulk non-volatile non-transitory computer-readable storage mediums (e.g., a hard disk, flash memory, etc.) for storing programs and other data for use and execution by the processing unit 702; a port 714 for interfacing with removable memory 716 that may include one or more diskettes, optical storage mediums (e.g., flash memory, thumb drives, USB dongles, compact discs, DVDs, etc.) and/or other non-transitory computer-readable storage mediums; a network interface 706 for communicating with other systems via one or more network connections and/or networks 708 using one or more communication technologies; a user interface 712 that may include a display and/or one or more input/output devices such as, for example, a touchscreen, a keyboard, a mouse, a track pad, and the like; and one or more busses 718 for communicatively coupling the elements of the system.

In some embodiments, the system 700 may, alternatively or in addition, include an SPU 710 that is protected from tampering by a user of the system 700 or other entities by utilizing secure physical and/or virtual security techniques. An SPU 710 can help enhance the security of sensitive operations such as personal information management, trusted credential and/or key management, privacy and policy management, and other aspects of the systems and methods disclosed herein. In certain embodiments, the SPU 710 may operate in a logically secure processing domain and be configured to protect and operate on secret information, as described herein. In some embodiments, the SPU 710 may include internal memory storing executable instructions or programs configured to enable the SPU 710 to perform secure operations, as described herein.

The operation of the system 700 may be generally controlled by the processing unit 702 and/or an SPU 710 operating by executing software instructions and programs stored in the system memory 704 (and/or other computer-readable media, such as removable memory 716). The system memory 704 may store a variety of executable programs or modules for controlling the operation of the system 700. For example, the system memory may include an operating system ("OS") 720 that may manage and coordinate, at least in part, system hardware resources and provide for common services for execution of various applications and a trust and privacy management system 722 for implementing trust and privacy management functionality including protection and/or management of personal data through management and/or enforcement of associated policies. The system memory 704 may further include, without limitation, communication software 724 configured to enable in part communication with and by the system 700, one or more applications, data management services 726 configured to implement various aspects of the disclosed systems and/or methods, and/or any other information and/or applications configured to implement embodiments of the systems and methods disclosed herein and/or aspects thereof.

The systems and methods disclosed herein are not inherently related to any particular computer, electronic control unit, or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network.

Software embodiments may be implemented as a computer program product that comprises a non-transitory storage medium configured to store computer programs and instructions, that when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, a magnetic disk, flash memory, integrated circuits, or any other non-transitory digital processing apparatus memory device.

Although the foregoing has been described in some detail for purposes of clarity, it will be apparent that certain changes and modifications may be made without departing from the principles thereof. For example, it will be appreciated that a number of variations can be made to the various embodiments, systems, services, and/or components presented in connection with the figures and/or associated description within the scope of the inventive body of work, and that the examples presented in the figures and described herein are provided for purposes of illustration and explanation, and not limitation. It is further noted that there are many alternative ways of implementing both the systems and methods described herein. Accordingly, the present embodiments are to be considered as illustrative and not restrictive, and the embodiments of the invention are not to be limited to the details given herein, but may be modified within the scope and equivalents of the appended claims.

What is claimed is:

1. A computer-implemented method for managing time series data performed by a data management service system, the method comprising:
   receiving a first time series data record included in a time series data stream, the first time series data record being associated with a first data topic and comprising a first timestamp;
   assigning a first sequence number to the first time series data record;
   determining, by a streaming writer service, based on information accessed from a definitions metastore and the first data topic, that the first time series data record is associated with a data topic indicated for storage in a hot data store;
   writing, by the streaming writer service, the first time series data record to a first data partition included in the hot data store;
   writing, by a canonical store writer service, the first time series data record to a canonical data store; and
   writing, by a segment extraction service, the first time series data record from the canonical data store to a first data partition included in a cold data store based on the information accessed from the definitions metastore, the first data partition included in the cold data store being associated with a first time bucket, the first timestamp being associated with the first time bucket.

2. The computer-implemented method of claim 1, wherein the first time series data record is associated with a topic offset number and the first sequence number comprises the first topic offset number.

3. The computer-implemented method of claim 1, wherein the first sequence number is unique to the first data partition.

4. The computer-implemented method of claim 3, wherein the first sequence number is greater than a sequence number assigned to a prior data record.

5. The computer-implemented method of claim 1, wherein determining that the first time series data record is associated with a data topic indicated for storage in the hot data store comprises determining that the first data topic comprises a topic indicated in the information accessed from the definitions metastore for storage in the hot data store.

6. The computer-implemented method of claim 1, wherein the first data partition is associated with the first data topic.

7. The computer-implemented method of claim 1, wherein writing the first time series data record to the first data partition included in the hot data store further comprises repartitioning the time series data.

8. The computer-implemented method of claim 1, wherein the hot data store comprises a cloud service data store.

9. The computer-implemented method of claim 1, wherein the canonical data store comprises a cloud service data store.

10. The computer-implemented method of claim 1, wherein the cold data store comprises a cloud service data store.

11. The computer-implemented method of claim 1, wherein the data management service system is configured to execute the streaming writer service, the canonical store writer service, and the segment extraction service.

12. The computer-implemented method of claim 1, wherein the method further comprises updating, in response to writing the first time series data record to the first data partition included in the hot data store, a shared data partitions index.

13. The computer-implemented method of claim 1, wherein the method further comprises updating, in response to writing the first time series data record to the canonical data store, a canonical segment index.

14. The computer-implemented method of claim 1, wherein the method further comprises updating, in response to writing the first time series data record from the canonical data store to the cold data store, a cold storage layer data segment index.

15. The computer-implemented method of claim 1, wherein the method further comprises receiving a second time series data record, the second time series data record being associated with the first data topic and comprising the first timestamp.

16. The computer-implemented method of claim 15, wherein the method further comprises assigning a second sequence number higher than the first sequence number to the second time series data record.

17. The computer-implemented method of claim 16, wherein the method further comprises:
   receiving, from a querying system, a request for access to a data record associated with the first timestamp;
   determining that the second sequence number is higher than the first sequence number; and providing access to the querying system of the second time series data record based on determining that the second sequence number is higher than the first sequence number.

\* \* \* \* \*